A. WALTERS & G. HENNKENS.
WHEEL.
APPLICATION FILED JAN. 27, 1913.
1,099,219.
Patented June 9, 1914.
2 SHEETS—SHEET 1.
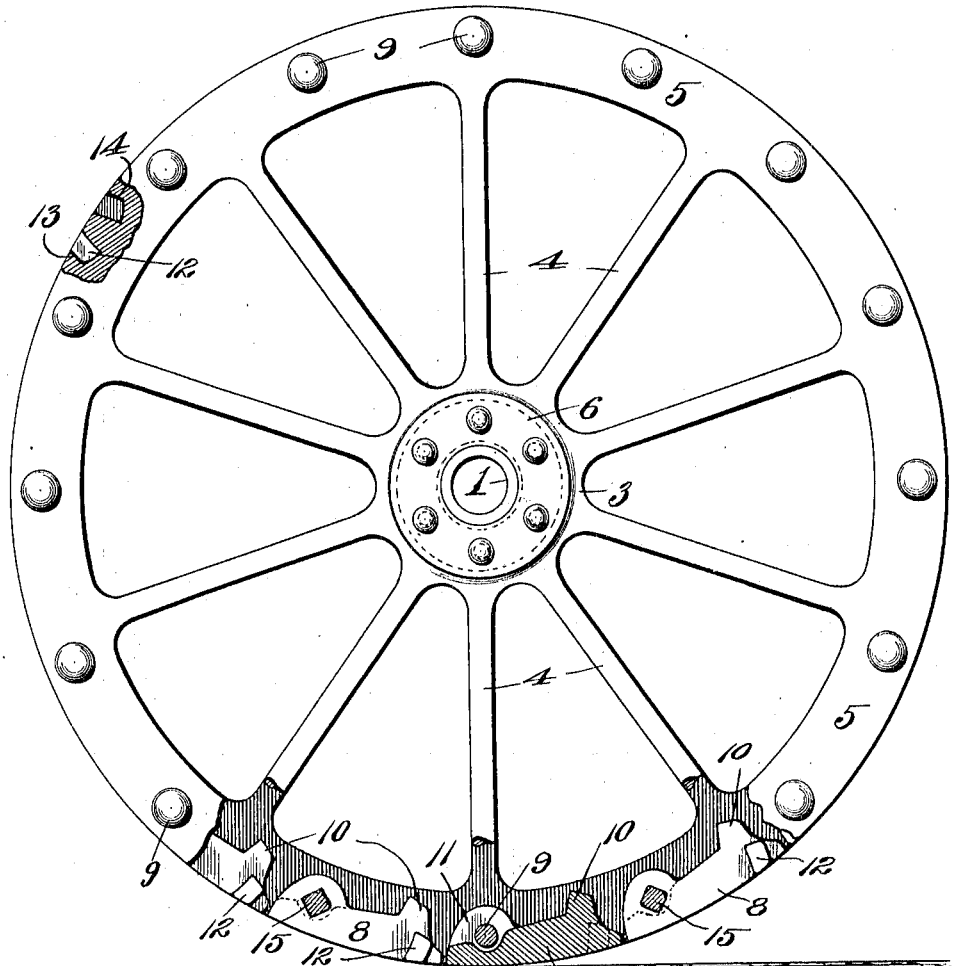
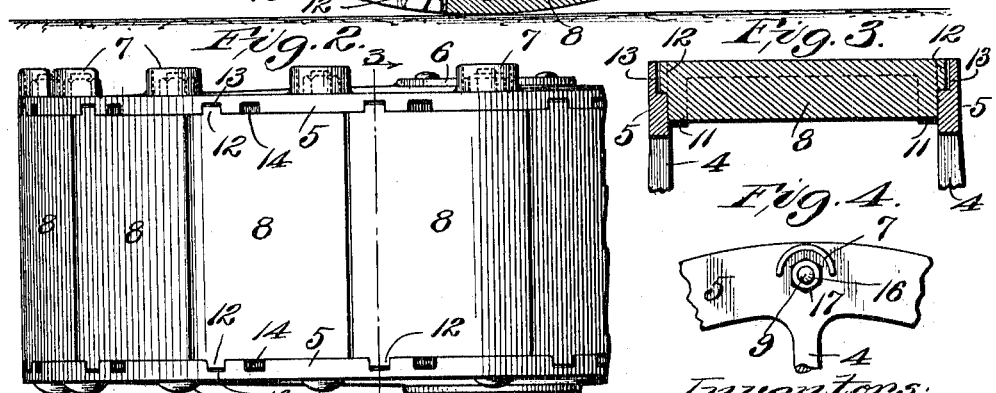
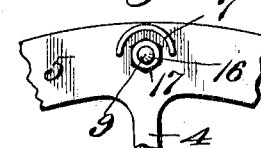
Inventors:
Anthoney Walters,
George Hennkens,
by Rippey & Kingsland, Attys.
Attest:
Wm. H. Scott.
Fred Hyke A. WALTERS & G. HENNKENS.
WHEEL.
APPLICATION FILED JAN. 27, 1913.
1,099,219.
Patented June 9, 1914.
2 SHEETS—SHEET 2.
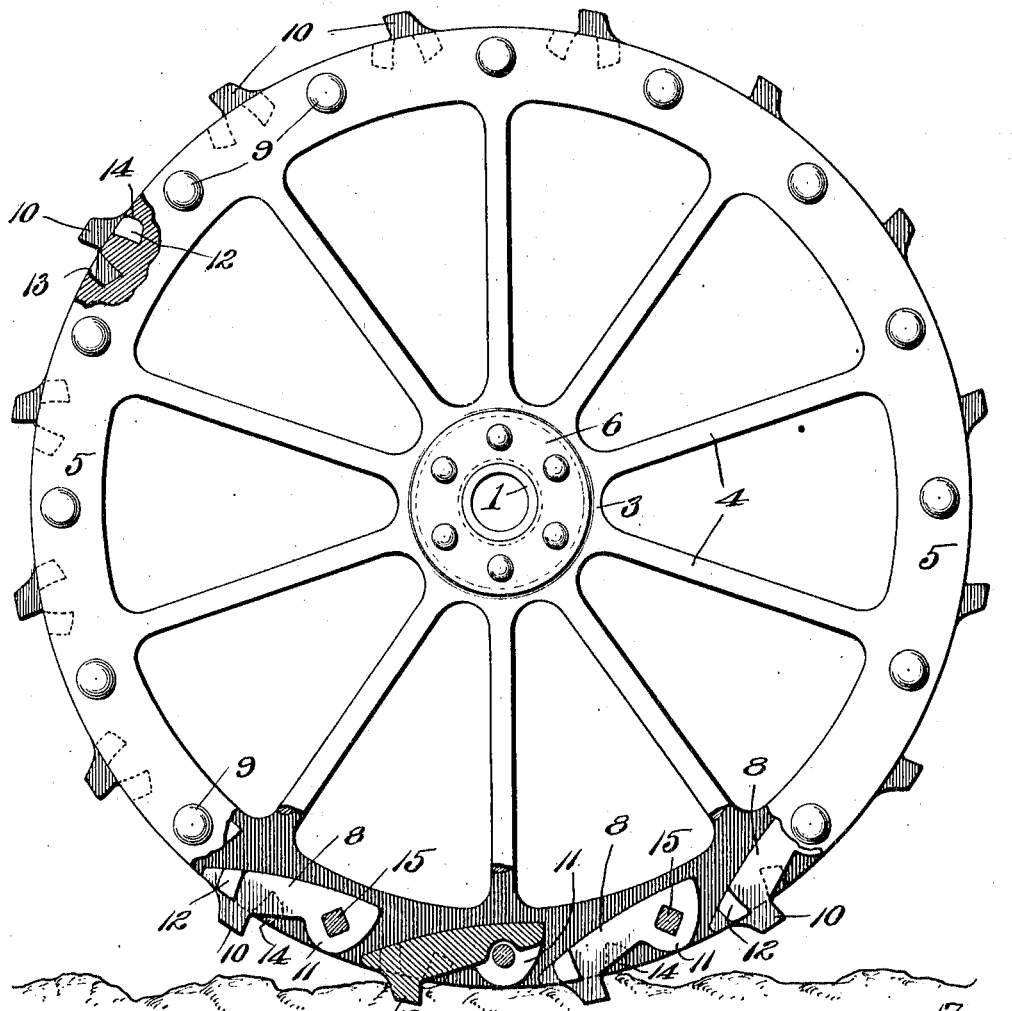
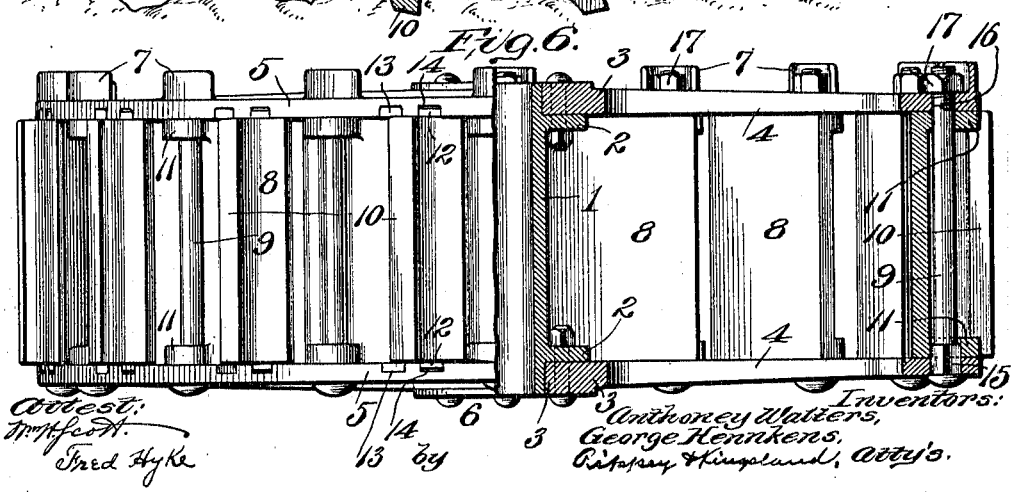

UNITED STATES PATENT OFFICE.

ANTHONEY WALTERS AND GEORGE HENNKENS, OF ST. LOUIS, MISSOURI, ASSIGNORS OF ONE-EIGHTH TO THEODORE ALBES, OF ST. LOUIS, MISSOURI.

WHEEL.

1,099,219.      Specification of Letters Patent.      Patented June 9, 1914.

Application filed January 27, 1913. Serial No. 744,340.

*To all whom it may concern:*

Be it known that we, ANTHONEY WALTERS and GEORGE HENNKENS, citizens of the United States, residing at St. Louis, Missouri, have invented a new and useful Wheel, of which the following is a specification.

This invention relates to improvements in wheels and more particularly to wheels for heavy traction or road engines.

An object of the invention is to provide a convertible wheel provided with a plurality of reversible tread blocks readily adjustable to form a smooth or rough tread as desired.

Another object of the invention is to produce a wheel, the tread of which is composed of duplicate and interchangeable tread blocks provided with a smooth and a cleated face and means for the ready adjustment of said blocks so as to present a continuous smooth surface in one adjustment and a cleated or tractor surface in the other adjustment.

A general object is to produce a substantial convertible wheel which comprises standard duplicate parts from which the wheel may be readily and economically assembled.

With these objects, in addition to other obvious valuable features of construction in view, we have designed and produced a wheel comprising the various parts and elements hereinafter more fully set forth in the specification, reference being made to the accompanying drawings in which—

Figure 1 is a side elevation of a wheel embodying our invention, a part of the rim being broken away to disclose the mounting and arrangement of the reversible tread blocks, the same, in this view, being shown in the smooth tread adjustment. Fig. 2 is a plan view of a portion of the improved wheel also showing the tread blocks in smooth tread adjustment. Fig. 3 is a transverse sectional detail view substantially on the line 3—3 of Fig. 2. Fig. 4 is a detail view illustrating the shield or guard for the head of one of the pivot bolts of the tread blocks. Fig. 5 is a side elevation similar to the illustration of Fig. 1, the tread blocks, however, being shown in adjustment to form a cleated or tractor tread, and Fig. 6 is a plan view of a wheel showing the tread blocks in cleated tread adjustment and one quadrant of the wheel being removed to show the arrangement of the hub.

In the embodiment of the invention illustrated in the drawings the hub 1 is provided with annular flanges 2 separated by any desired space, according to the requirements for different widths of wheels.

Hub plates 3, provided with radiating spokes 4, which support annular rims 5, are mounted upon the hub 1 and are bolted to the flanges 2 by bolts which pass through openings in said hub-plates 3, and through the reinforcing bosses 6 formed integral with said plates 3. The side elements comprising the plates 3, the spokes 4 and the rims 5 are duplicate in construction with the exception that semicircle lugs or projections 7 are formed on one of the pair of side elements which lugs or projections constitute guards for the nut head of the tread block retaining bolts.

A series of tread blocks 8 are mounted between the rims 3 on pivot bolts 9 which extend through holes formed in the rims 5. The tread blocks 8 are formed so that one side thereof presents a curved surface which is a segment of a circumference of the same contour as the periphery of the rims 5, so that when the tread blocks 8 are arranged as shown in Fig. 1 their united exterior surface forms a smooth annular tread. The opposite faces of the tread blocks 8 have formed thereon transverse ribs or cleats 10 so that when the tread blocks are turned to the position shown in Fig. 5, the tread of the wheel presents a tractor surface resulting from the spaced ribs or cleats 10 which extend beyond the rims 5 of the wheel. Upon the same face of the tread blocks 8 that contain ribs or cleats 10 but at the opposite end of the blocks, are formed at either side thereof ears or projections 11, which are provided with holes constituting eyes for receiving the pivot bolts 9 and at the side of the tread blocks are formed projections or lugs 12, which are arranged to seat in a series of laterally alined slots or recesses formed in the inner face of the rims 5. The series of slots in which the projections or lugs 12 seat, when the tread blocks 8 are in smooth tread adjustment, are indicated by 13 and are inclined from the axis of the bolts 9, as shown in Fig. 1, and the series of slots in which the projections or lugs 12 seat when the tread blocks 8 are in cleated surface adjustment inclined toward the bolts 9 are indicated by 14.

Bolts 9 are formed with integral heads 15 and screw portions 16 which are adapted to receive threaded nuts 17. In assembling the tread blocks 8 the bolts are passed through the holes in the rims 5, holes in one rim member being rectangular and those in the other being circular, so that the rectangular heads 15 of the bolts 9 seat in the rectangular holes in the rim member and project into corresponding rectangular holes in the ears or lugs 11 formed in the tread blocks 8 when the bolts 9 have been drawn into place by adjustment of the nuts 17, thus effectively locking the tread blocks in either of the adjustments shown in Fig. 1 or in Fig. 5.

It will be observed that in the cleated tread adjustment shown in Fig. 5 that there is a slight space between the ends of the adjacent cleat blocks 8, so as to form in effect an open tread preventing dirt from clogging in the irregular space between the projecting cleats or ribs 10. It will also be observed that when the tread blocks are adjusted, as shown in Fig. 1 to form the smooth tread, that the outer surface of the blocks is flush with the periphery of the rims 5 and that the lugs or projections 12 fit snugly into the grooves or recesses 13, leaving only the small grooves or recesses 14 as an interruption to the perfectly smooth tread of the wheel.

It is preferred that the wheel be constructed of cast steel; but it will readily be seen that any suitable material may be employed. The wheel is particularly adaptable for use with heavy traction engines where a wheel with a tractor surface is required at certain times but where such a rough tractor surface is detrimental to highways and public roads when the engine is being moved from place to place.

We are aware that certain details of construction may be varied without departing from the spirit and scope of our invention. We do not limit ourselves, therefore, to exact details but

What we claim and desire to secure by Letters Patent is:

1. A wheel comprising a hub member, side elements supported by said hub member, a plurality of adjustable tread blocks supported between said side members adjacent to the periphery thereof and adapted to form in one adjustment a continuous annular rim of a smooth surface and in the other adjustment a cleated tractor surface, and means for supporting said tread blocks in either of said adjustments.

2. A wheel comprising two spaced hub plates, a series of spokes radiating from each of said plates, an annular rim carried by each of said series of spokes, a plurality of bolts supported between said rims, a series of tread blocks pivotally carried by said bolts between said rims, said tread blocks being provided with a smooth curved surface and also a cleated surface and adapted to form a continuous smooth annular rim when in one adjustment and adapted to be reversed to form a tractor rim for said wheel in the other adjustment, substantially as specified.

3. A wheel comprising a hub, spokes and vertical rim members supported by said spokes, a series of independently adjustable tread blocks pivotally carried by bolts supported by said rim members, said tread blocks being formed with one surface thereof curved and adapted to form together a smooth continuous annular tread for said wheel, the reverse surface of said tread blocks being provided with cleats and adapted to form a tractor tread for said wheel, projecting lugs carried by each of said tread blocks, recesses in said rim members adapted to receive said lugs carried by said tread blocks to hold said blocks in either adjustment, substantially as specified.

4. A wheel comprising hub members, spokes supported by said hub members and rims supported by said spokes, a series of rods supported between said rim members, a series of tread blocks pivotally supported by said rods, said tread blocks having one face thereof smooth and adapted to form together a continuous annular surface and the other face of each of said tread blocks being provided with cleats and adapted to form together a tractor tread, and so mounted upon said pivot rods carried by said rim members that when in cleated adjustment an open space will remain between the abutting ends of said tread blocks, and means for holding said tread blocks in the desired adjustment.

5. A wheel comprising open side members, rods supported near the periphery of said wheel and extending through the said side members, guards projecting from the face of one of said side members for protecting the nut end of said rods, tread blocks pivotally supported by said rods and adapted to be held in two adjustments and so formed as to present in one adjustment a continuous smooth surface and in the other adjustment a tractor surface and each of said blocks being adjustable independently of the others, substantially as specified.

In witness whereof, we have signed this specification in the presence of two subscribing witnesses.

ANTHONEY WALTERS.
GEORGE HENNKENS.

Witnesses:
L. C. KINGSLAND,
THEO. ALBER.